United States Patent [19]
Georgieff

[11] 3,817,116
[45] June 18, 1974

[54] FOLLOWER POSITIONING AND INDEXING CAM FOR ROLLER GEAR DRIVE AND METHOD OF USE

[75] Inventor: Stephen K. Georgieff, Des Peres, Mo.

[73] Assignee: UMC Industries, Inc., St. Louis, Mo.

[22] Filed: Sept. 25, 1972

[21] Appl. No.: 292,078

[52] U.S. Cl. .................................. 74/426, 74/465
[51] Int. Cl. ........................ F16h 1/16, F16h 55/06
[58] Field of Search ............................ 74/426, 465

[56] References Cited
UNITED STATES PATENTS
1,241,911   10/1917   Blake ................................. 74/426
1,920,969   8/1933    Carpenter ..................... 74/426 UX OTHER PUBLICATIONS
Bulletin No. 107B Ferguson Machine Corp. of Indiana Roller Gear Div. 7818 Maplewood Industrial Ct., St. Louis, Mo.

Primary Examiner—Leonard H. Gerin
Attorney, Agent, or Firm—Paul M. Denk

[57] ABSTRACT

In a roller gear drive, a plurality of followers mounted upon its hub are arranged for cooperating with an indexing cam providing for periodic or continuous indexing of the drive, with at least one of the indexable follower(s) being disposed for actuation by the index portion of the cam to provide for indexing of the drive, but while the drive is maintained in the period of dwell, the indexable follower(s) are idly disposed within a clearance groove provided on the cam while the just preceding and succeeding followers are positioned upon beveled surfaces arranged on the sides of the cam opposite the clearance groove to provide for precise tolerance positioning and functioning of the roller gear drive. In the process of utilizing the aforesaid drive, the indexable follower(s) may provide for indexing of the roller gear drive as it encounters the index portion of the cam, but as the drive enters a period of dwell, or approximating dwell, said indexing follower(s) enters into an idle position within the clearance groove of the cam while the just preceding and succeeding followers encounter the beveled surfaces to provide for precise positioning, greater accuracy, and structural stability in the operation of the roller gear drive when within the range of this near dwell function.

7 Claims, 5 Drawing Figures

3,817,116

FOLLOWER POSITIONING AND INDEXING CAM FOR ROLLER GEAR DRIVE AND METHOD OF USE

BACKGROUND OF THE INVENTION

This invention relates generally to roller gear drives, and more particularly pertains to a series of followers that cooperate with a specially designed cam to provide for separate indexing and dwell positioning of distinct and discrete followers to enhance the accuracy, stability and endurance of such drives.

Cam and follower constructions for roller gear drives are available in the prior art providing for significant accuracy and increased useful life in the operation of such components when employed in drives of this design. For example, in U.S. Pat. No. 2,714,315, owned by a common assignee, one of the basic designs for roller mounting for roller gear drives is shown, wherein bearing mounted rollers functioning as followers cooperate with the helicoid cam to achieve precision indexing. Such roller gear drives have been very effective in improving the quality of service of indexing devices, but by the very nature of the design of the helicoid shape of the cam, they are difficult and expensive of manufacture due to the complex cam shapes embodied in designs of this type. The precision contour machining of the helicoid type cam surfaces generally require specially designed equipment in addition to skilled technicians to manufacture this type of cam component for the roller gear drives.

Of more recent origin has been the construction of the cam and follower combinations for gear reduction apparatuses wherein to achieve greater output torque from a drive, the cam member is formed having a concaved surface for a cam of greater width than heretofore used in industry, said cam surface having a series of continuous contoured slots provided therein for accommodating more than one cam follower, at a time. This innovation is shown in the two patents to J. P. McCartin, having U.S. Pat. Nos. 3,477,305, and 3,495,470. If the construction of the roller gear drives shown in the previous patent to Reader require the use of specially designed machinery to grind a helicoid or a cam surface, the problem is multi-compounded when manufacturing the type of continuous spherical thread of McCartin, comprising the plurality of continuous contoured slots.

It is, therefore, the principal object of this invention to provide an indexing cam for a roller gear drive in which the major portion of the surface engaged by the follower hub is externally arranged to facilitate the precision grinding of such device upon conventional machinery.

Another object of this invention is to provide an indexing cam for a roller gear drive which incorporates a clearance groove between those surfaces that contact the positioning followers, and into which clearance groove the indexable follower may idly traverse during the period of dwell, or near dwell, of the drive.

It is another object of this invention to provide a combination indexing cam and the follower hub that cooperate to provide for stability of positioning through the contact of at least two followers upon somewhat opposite surfaces arranged upon the cam at all times so as to enhance the accuracy and close tolerance operation of the indexing device.

It is a further object of this invention to provide a method of indexing wherein separate followers of an indexing drive are arranged in accurate positioning during movement through a period of dwell, or near dwell, whereas a separate follower is provided for functioning during the indexing cycle.

Still another object is to provide a simplified method for preparing indexing cams.

Yet another object of this invention is to provide an indexing assembly which is economical to manufacture, and yet of greater precision in operation than prior indexing drives.

Other objects will become more apparent to those skilled in the art in the light of the following summary, and the description of the preferred embodiment when read in view of the accompanying drawings.

SUMMARY OF THE INVENTION

This invention generally contemplates the usage of a multi-ribbed, preferably dual ribbed, indexing cam such as formed as a ribbed or grooved barrel or cylindrical type cam, in which the contoured surfaces of the ribs are externally arranged and employed for cooperating with a pair of spaced followers of a hub to furnish accuracy of positioning of an indexing drive during the dwell or near dwell period, while providing clearance for an intermediately disposed indexable follower, with the latter follower disposed for eventual engagement with the index portion of the cam for indexing of the roller gear drive. The groove formed intermediate the pair of ribs is milled specifically only for providing clearance for the indexable follower(s) idly passing therethrough as while the cam rotates during a period of dwell, or near dwell, thereby eliminating the necessity for precision grinding of such intricate interior grooves as had generally been required for cams of prior roller gear drives. The pair of ribs each has a beveled or contoured surface formed on its side opposite the location of said clearance groove, and the surfaces are predesigned and disposed for contact by the follower just preceding and succeeding the index follower(s), so that during cam movement in the period of dwell these pair of followers are in constant and somewhat opposing contact with the contiguous cam surfaces to provide precise positioning of the follower hub with respect to said cam. As previously described, during movement of the cam through its dwell portion the indexable follower readily traverses through the clearance groove intermediate these two ribs and groove walls, after having previously indexed either during its entrance into the clearance groove, or as it exits from the same, as during an index cycle. To provide further accuracy and close tolerance operation of this roller gear drive, two preceding and succeeding followers are desirably in contact at all time with nearly oppositely disposed surfaces of the cam, so that even during the index segment of functioning as when the index follower encounters the helical portion of the cam surface, either one of the preceding or succeeding followers will be in contact with an oppositely disposed surface to provide stable positioning of the follower hub, and its driven shaft, with respect to the cam and its drive shaft, and vice versa. In this manner no drive backlash is encountered. And, during the index period a pair of followers may be positioned in contact on either side of the index rib of the cam to enhance precision operation of the drive. Hence, during the period of index there may be two index followers in cam contact, in addition to one of the preceding or succeeding followers, for a total of three followers in cam engagement to insure accuracy.

In addition, to the advantage of alleviating the necessity for specially designed equipment for grinding the precise indexing and follower positioning surfaces of this designed cam, another advantage of this design is a reduction in the incidence of wear of the combined followers and cams since the indexable follower is allowed to come to an idle position between index cycles due to its passive movement through the clearance groove as during periods of dwell of the roller gear drive, or when the drive functions within the proximity of the dwell period. On the other hand, when the indexable follower is non-reversing, there may yet be some contact within the clearance groove without impairing the precision operation of this invention.

BRIEF DESCRIPTION OF THE DRAWINGS

In the drawings, FIG. 1 provides a partial sectional view of a roller gear drive showing the cooperation between its follower hub and the designed cam of this invention.

DESCRIPTION OF THE PREFERRED EMBODIMENT

Figure 1:
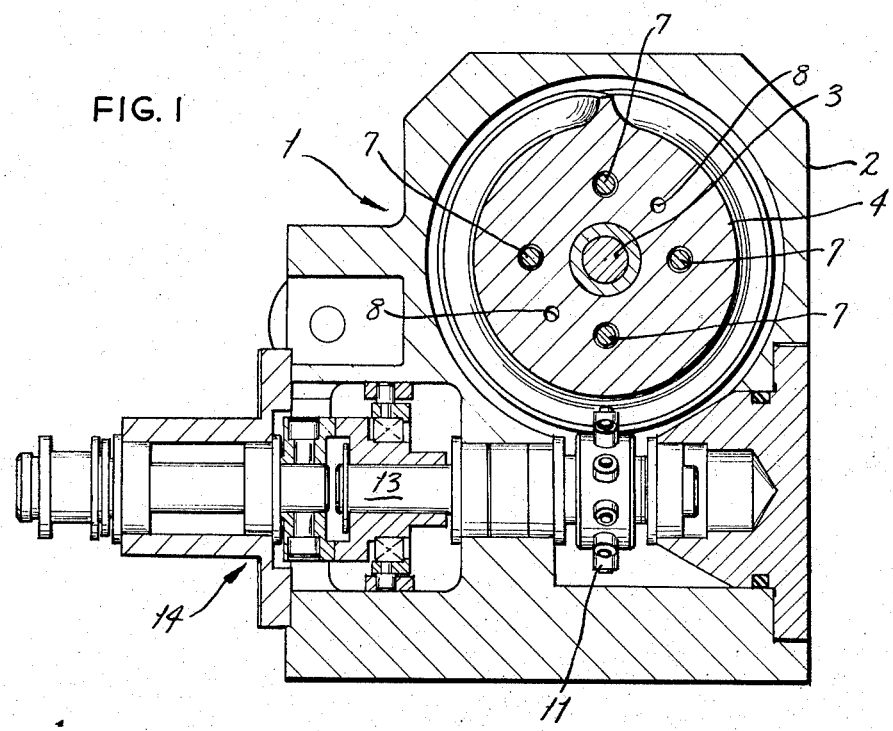
Figure 2:
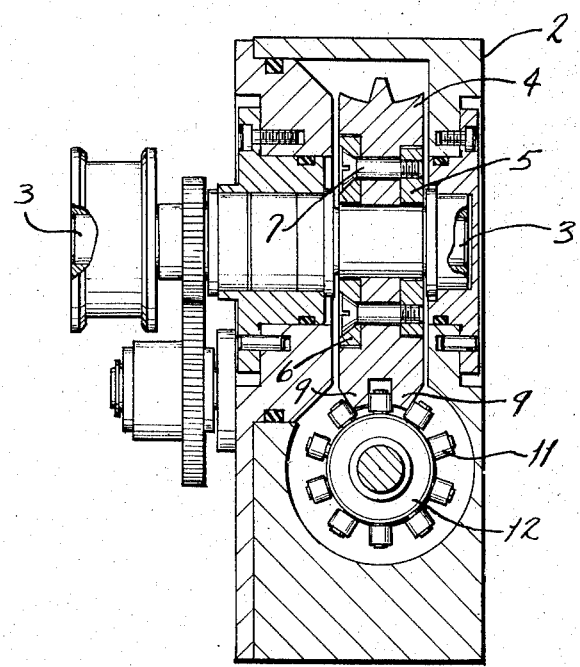
FIG. 2 provides an end sectional view of this drive with the indexable and positioning followers of the hub cooperating with the cam of this invention during a period of dwell, or near dwell.

Referring to the drawings, and initially in particular FIGS. 1 and 2, there is disclosed generally a roller gear drive 1 embodied in its housing 2 and which usually incorporates a drive shaft 3, driven by a prime mover (not shown) usually an electrical motor. Rigidly fixed to the drive shaft 3 is the cam means 4 of this invention. The cam means is secured upon the drive shaft 3 by means of a series of insert plates 5 and 6 retained together by means of a series of fasteners, such as the screws 7. One of said plates may be integrally secured or keyed to the drive shaft 3, usually the plate 6, while the other plate is fastened by means of said screws 7 for positioning and fixing the cam with respect to said drive shaft. In addition, a couple of positioning dowel pins 8 may be provided for assisting in the fixing of the cam with respect to said plates.

The cam 4 is provided with formed ribs 9 and an intermediate groove 10 at its circumferential edge, as will be hereinafter described, and disposed for mating with said ribs and within said groove are the bearing mounted roller followers 11 connecting upon the hub 12 of the device. The hub is engaged upon a driven or output shaft 13 which is bearing mounted itself to the housing 2, to provide for an indexed or intermittent output through the clutch mechanism or reduction gearing generally disclosed at 14.

Figure 3:
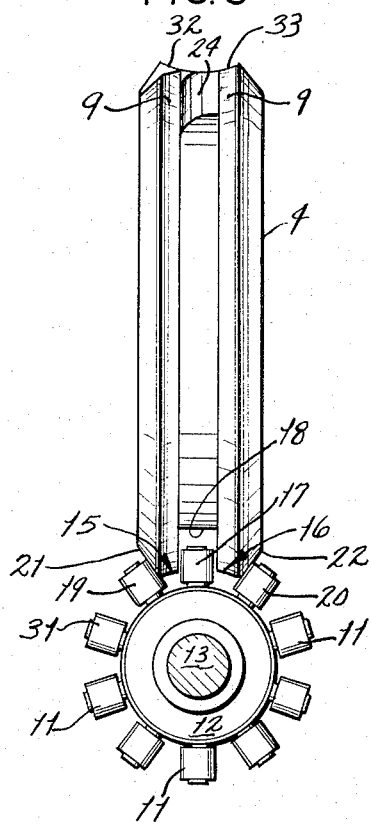
FIG. 3 provides an end view of just the follower hub and the cam of this invention similar to the view of the cam components as shown in FIG. 2.
Figure 4:
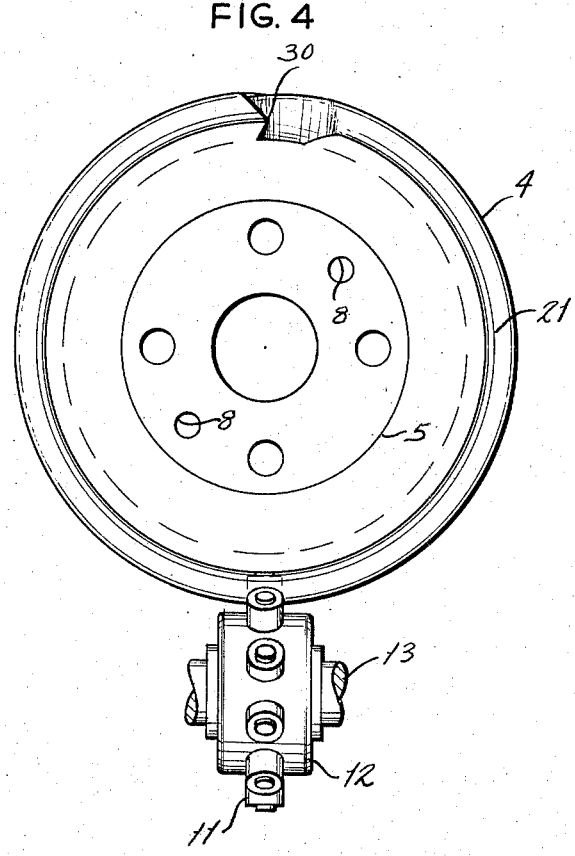
FIG. 4 provides a side view of the follower hub and cam of this invention as shown in FIG. 3.
Figure 5:
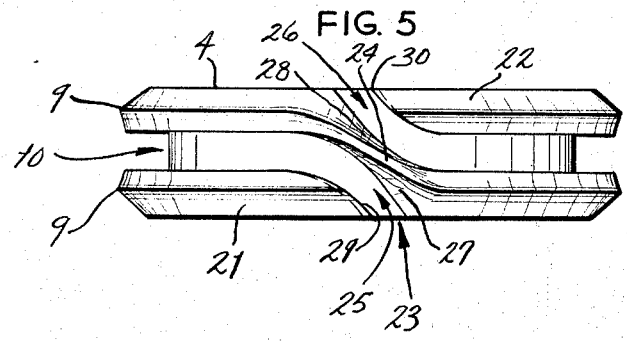
FIG. 5 provides an edge view of the cam of this invention disclosing the relationship between the indexing and dwell portions of said cam with its clearance groove being arranged intermediate the pair of cam ribs.

The principle and concept of this invention, and its preferred embodiment, is shown in FIGS. 3 through 5 wherein the relationship between the follower hub 12, and more particularly its individual followers 11, with respect to the integral positioning ribs 15 and 16, is more accurately disclosed. Essentially the invention contemplates the use of separate followers for positioning of the hub, and its output shaft 13 during the period of dwell, while an intermediate follower, as at 17, rides free within a clearance groove 18 formed in the cam 4. The positioning followers, which in this particular instance would be disclosed as followers 19 and 20 are in contact with the beveled or contoured surfaces 21 and 22 formed on the sides of the cam opposite to the disposition of the formed groove 18, and under this arrangement, the positioning followers provide for their close tolerance or contiguous riding upon the respective surfaces 21 and 22 as when the cam 4 moves through the period of dwell, or approximate dwell, while at the same time, the now index follower 17 passes with clearance through the clearance slot 18 without interference. To provide for the close contact of the positioning followers upon the surfaces 21 and 22, the cam 4 may be mounted with some preloading with respect to the follower hub 12 so that the followers 11 will snugly ride upon their contiguous cam surfaces. An indexing cam 4 of this nature usually incorporates a period of dwell, or a cycle approximating dwell, in its indexing cycle. And, during the period of revolution of the cam there may be disposed one or more indexing portions, as at 23, to provide for some angular turn of the follower hub and its associated output shaft 13. The indexing portion of this particular cam is herein disclosed as a short segment of the helicoid or other rib 24 that is integrally formed communicating between the pair of ribs 9, so that as the follower 17 enters into the entrance portion 25 of the cam, or exits the same through the passage 26, it will encounter the rib 24 and be diverted to provide some degree of angular motion or indexing of the aforesaid hub 12. It should obviously be recognized that as the cam 4 continued to turn in one direction, one of the followers adjacent to the index follower 17, in this situation the follower 19, will eventually become the indexable follower, with the follower 17 then becoming one of the positioning followers that encounters the surfaces 21 or 22 of the cam 4.

In principle, though, the concept of this invention is to provide for a slight pressure contact of at least two followers upon somewhat oppositely disposed surfaces of the cam 4 at all times, so that, as previously described, while the cam moves through its period of dwell, as shown in FIG. 3, the positioning followers 19 and 20 will engage the surfaces 21 and 22 to provide precise positioning of the hub 12 with respect to its cam of the roller gear drive, but that when the indexable follower 17 encounters the index portion 23, more properly identified as the structural rib 24 of said cam, said follower engages either the camming surfaces 27 or 28 depending upon whether this follower 17 is entering or exiting from the cam 4. While this is occurring, one or the other of the followers 19 or 20 may yet be positioned in contact with the surfaces 21 and 22 approaching their respective edges 29 or 30 to be engaged or released from the same. In this particular designed cam, a five degree overlap is formed between the period of time that the index follower 17 encounters the surface 27 of the rib 24 before the follower 20 disengages from the surface 22 just proximate its termination at the edge 30. Likewise, as the index follower 17 may be exiting the groove 18 via the channel 26, and encounters the indexing surface 28 of the rib 24, as it encounters this position the follower next adjacent the positioning follower 19, or more specifically follower 31, becomes positioned upon the surface 21 of the rib 15 along its edge 29. Hence, even during the indexing portion of a cycle of operation of this cam, two somewhat opposing followers are always in contact with oppositely disposed surfaces to provide precise positioning and close tolerance movement of the follower hub 12 and its driven shaft 13 with respect to the revolving of the cam 4 of this roller gear drive. Thus, both backlash and loose play are eliminated in the indexing of the hub 12 and the output shaft 13.

One advantage acquired through the relationship of the follower hub 12 and the designed cam of this invention is the significant reduction of abrasive wear on the indexable follower particularly where it encounters the reversal point, as at the index portion 23 of the cam. For example, as one views the cam 4 as disclosed in FIG. 5, it can be seen that as the index follower 17 enters into the channel 25 and encounters the index surface 27, the bearing mounted follower will be turning in a clockwise direction. But, as the cam 4, in this particular design, is rotated approximately 300°, or more degrees, thereby bringing the index follower 17 into contact with the camming surface 28, said follower will be urged to rotate in an opposite or counterclockwise direction. As previously analyzed, the groove 18 intermediate the pair of ribs 15 and 16 is designed to provide clearance and freedom of passage for the index follower 17 from one period of index to the next, which therefore allows some period of time for this particular follower to come to rest before it encounters the next indexing surface of the cam. Heretofore, as previously stated, where followers are required to pass a reversal point in a cam, as in the helicoid type, and are always actively in contact with said cam, such followers may be forced to turn in a opposite direction thereby being subjected to abrasive contact that accelerates its wear and eventual fatigue. The principle of this invention is designed to allow the index follower to become inactive between periods of index, thereby staging the follower for its next period of index, and thereby reducing its incidence of wear.

Although the preferred embodiment of this invention discloses that only one follower at a time may be disposed within the clearance groove 18 of the cam, it is just as likely that the cam may be designed having a clearance groove of double the disclosed width, or even greater, so that more than one follower may be accommodated therein at a time. For example, followers 20 and 31 may at one particular instance comprise the positioning followers that contact the respective cam surfaces 21 and 22, while the followers 17 and 19 may comprise the indexable followers and both are positioned within the clearance groove at one time. Likewise, the index portion 23 of the cam may be designed to provide for a double index of these two followers at one time.

For purposes of providing clearance in the coordinated operation of the hub 12 with respect to its associated cam 4, the interior edges 32 and 33 of the ribs 15 and 16 may be milled on a contour approximating the circumference of the follower hub 12 to allow for a closer association of the followers with respect to the positioning surfaces 21 and 22 of the cam. These clearances may be designed as close as, for example, one-sixteenth of an inch providing for compactness of structure and greater contact between the followers and the various positioning and indexing surfaces of the cam 4, enhancing the close tolerance operation and functioning of this roller gear drive.

Other variations in the formation of a multi-ribbed cam and follower combination as disclosed in this invention may occur to those skilled in the art in light of the teachings of this disclosure. The description of this preferred embodiment is merely illustrative, and any variations within the scope of the appended claims are desired to receive patent protection.

Having thus described the invention what is claimed and desired to be secured by Letters Patent is:

1. An indexing cam for use in combination with bearing mounted roller followers rotatably connecting to a follower hub of a roller gear drive comprising a cam means, said follower hub having at least one indexable follower and preceding and succeeding followers thereof, said cam means having an indexing portion and a dwell portion, said cam means incorporating a clearance groove for accommodating at least one indexable follower during its movement through the dwell portion, beveled surfaces formed to either side of said clearance groove and disposed for being engaged by said preceding and succeeding followers during cam movement through a period of dwell, during the period of index said indexable follower and one of said preceding and succeeding followers being in pressure contact with substantially oppositely disposed surfaces to provide stable positioning of the follower hub with respect to the indexing cam, and said indexing cam being preloaded in its mounting with respect to the follower hub to insure the pressure contiguity between said cam and hub during both the index and dwell cycles.

2. The invention of claim 1 wherein the period of contact of the indexable follower with the index portion of the cam means overlaps the period of engagement of the preceding and succeeding followers with their respective beveled surfaces.

3. The invention of claim 2 and further including about a 5° overlap in the turn of said indexing cam during movement through the indexing cycle while the preceding and succeeding followers retain contact with their respective beveled edges to insure a constant pressure contact between at least two of the followers and substantially oppositely disposed surfaces of the cam.

4. The invention of claim 1 wherein during further movement of said cam the suceeding follower becomes an indexable follower during each index cycle of the cam means.

5. The invention of claim 1 wherein a cycle of said roller gear drive includes movement through the cam indexing and dwell portions during a revolution of said cam means.

6. The invention of claim 1 wherein a cycle of said roller gear drive includes movement through the cam indexing and dwell portions during less than one revolution of said cam means.

7. An indexing cam for use in combination with bearing mounted roller followers of the follower hub of a roller gear drive comprising a cam means, said follower hub having at least one indexable follower and preceding and succeeding followers thereof, said cam means having an indexing portion and a near dwell portion, said cam means incorporating a clearance groove for accommodating at least one indexable follower during its movement through the near dwell portion, beveled surfaces formed to either side of said clearance groove and disposed for being engaged by said preceding and succeeding followers during cam movement through a period of near dwell, during the period of index said indexable follower and one of said preceding and succeeding followers being under pressure contact with substantially oppositely disposed surfaces to provide stable positioning of the follower hub with respect to the indexing cam, and said indexing cam being preloaded in its mounting with respect to the follower hub to insure a pressure contiguity between said cam and hub during both the indexing and near dwell cycles.

* * * * *